(12) United States Patent
Desai et al.

(10) Patent No.: US 7,720,213 B2
(45) Date of Patent: May 18, 2010

(54) PARAMETER DEPENDENT RING TONES

(75) Inventors: Snehal Desai, Plano, TX (US); Atiya Suhail, Plano, TX (US); Kashipati G. Rao, Plano, TX (US)

(73) Assignee: Alcatel Lucent, Paris (FR)

( * ) Notice: Subject to any disclaimer, the term of this patent is extended or adjusted under 35 U.S.C. 154(b) by 685 days.

(21) Appl. No.: 11/026,441

(22) Filed: Dec. 30, 2004

(65) Prior Publication Data
US 2006/0147002 A1 Jul. 6, 2006

(51) Int. Cl.
H04M 3/42 (2006.01)
(52) U.S. Cl. .................... 379/207.16; 455/566
(58) Field of Classification Search ............ 379/207.16, 379/373.01, 88.17, 210.01, 211.02, 211.03; 455/566, 412.2
See application file for complete search history.

(56) References Cited

U.S. PATENT DOCUMENTS

| | | | |
|---|---|---|---|
| 5,276,731 A * | 1/1994 | Arbel et al. ............ | 379/211.02 |
| 5,329,578 A * | 7/1994 | Brennan et al. ........ | 379/211.03 |
| 6,418,309 B1 | 7/2002 | Moon et al. | |
| 6,901,139 B2 * | 5/2005 | Gonzalez et al. ....... | 379/207.16 |
| 6,965,786 B2 * | 11/2005 | Qu et al. ..................... | 455/566 |
| 7,058,429 B2 * | 6/2006 | Fujito et al. ................. | 455/567 |
| 7,248,900 B2 * | 7/2007 | Deeds ......................... | 455/567 |
| 7,493,125 B2 * | 2/2009 | Nagesh et al. ............ | 455/414.2 |
| 2002/0077086 A1 * | 6/2002 | Tuomela et al. ............. | 455/414 |
| 2004/0109558 A1 * | 6/2004 | Koch ...................... | 379/373.01 |
| 2004/0120494 A1 * | 6/2004 | Jiang et al. ............. | 379/210.01 |
| 2004/0157588 A1 * | 8/2004 | Stepman et al. .......... | 455/414.1 |
| 2004/0213401 A1 * | 10/2004 | Aupperle et al. ............ | 379/372 |
| 2006/0003742 A1 * | 1/2006 | Seligmann et al. ....... | 455/412.2 |

FOREIGN PATENT DOCUMENTS

| | | |
|---|---|---|
| EP | 1 260 949 A1 | 5/2002 |
| EP | 1 417 701 A1 | 5/2004 |
| WO | WO 03/015380 A1 | 2/2003 |

* cited by examiner

*Primary Examiner*—Curtis Kuntz
*Assistant Examiner*—Maria El-Zoobi
(74) *Attorney, Agent, or Firm*—RG and Associates

(57) ABSTRACT

A phone (12) identifies the nature of a desired communication by receiving data related to a purpose of the communication from parsers (26) and comparing the data to predetermined criteria specified by filters (24). A ring tone is selected from a set of ring tone responsive to the comparison. The ring tone could provide either audio or tactile stimulation, or both. Tactile stimulation could be provided, for example through different vibration patterns. Alternatively, a graphic may be shown responsive to the comparison.

22 Claims, 2 Drawing Sheets

| Filter name | Boss_and_urgent |

| Calling Party ▼ | is ▼ | Higher on org chart ▼ |

AND ▼

| Unreturned calls ▼ | > ▼ | 0 ▼ |

OR ▼

| Subject line ▼ | contains ▼ | Urgent ▼ |

Priority | 2 ▼ | Ring Tone | Beethoven's Fifth ▼

Silent Ring Tone | DotDotDotDash ▼

*FIG. 3*

PARAMETER DEPENDENT RING TONES

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to digital communications and, more particularly, to a method and apparatus for announcing a communication request.

2. Description of the Related Art

Voice communication is the most common form of communication for both personal and private purposes. For many years the telephone has been the primary tool for voice communications. While efficient for communicating, the telephone can be distracting as well. Often, telephone calls are not answered because the receiving party is busy with another task, or is talking to another party.

Caller ID provides some information regarding the calling party. Some phones allow for different ring tones to be associated with different incoming numbers. While this may provide the receiving party with the identity of the caller, or the employer of the caller, it does not provide information regarding the nature of the call.

VOIP (voice over internet protocol) phones may provide additional information regarding the nature of the call in a "subject line" which is passed to the answering phone with the invite message. Also, additional "presence" information may be provided. However, this information is useful only if the receiving party can access the information. Accessing the information may not be practical in many situations, for example if the receiving party is in a meeting with someone else, or is driving a car. Further, if the receiving party is otherwise involved in work, he or she may not take the time to look at the information.

Therefore, a need has arisen for an improved method and apparatus for determining the nature of a communication request without interacting with the communication device at the moment of call notification.

BRIEF SUMMARY OF THE INVENTION

In the present invention, the nature of a desired communication is identified by receiving data related to a purpose of the communication, comparing the data to predetermined criteria, and selecting a ring tone from a set of ring tones responsive to the comparing step.

The present invention allows a receiving party to identify the purpose of a communication request by a ring tone according to predetermined criteria. Thus, a receiving party can make a decision to answer a call without the need to view identifying data.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 3 illustrates a screen for providing a user-configurable filter to associate a selected ring tone with various criteria.

DETAILED DESCRIPTION OF THE INVENTION

Figure 1:
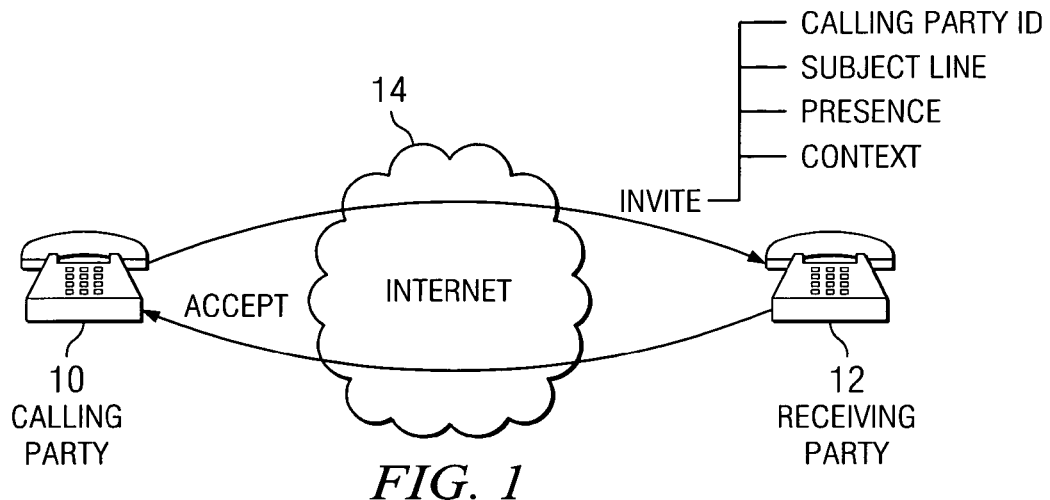
FIG. 1 illustrates a block diagram of a connection between a calling party phone and an answering party phone where information regarding the nature of the call is passed from the calling party phone to the answering party phone.
Figure 2:
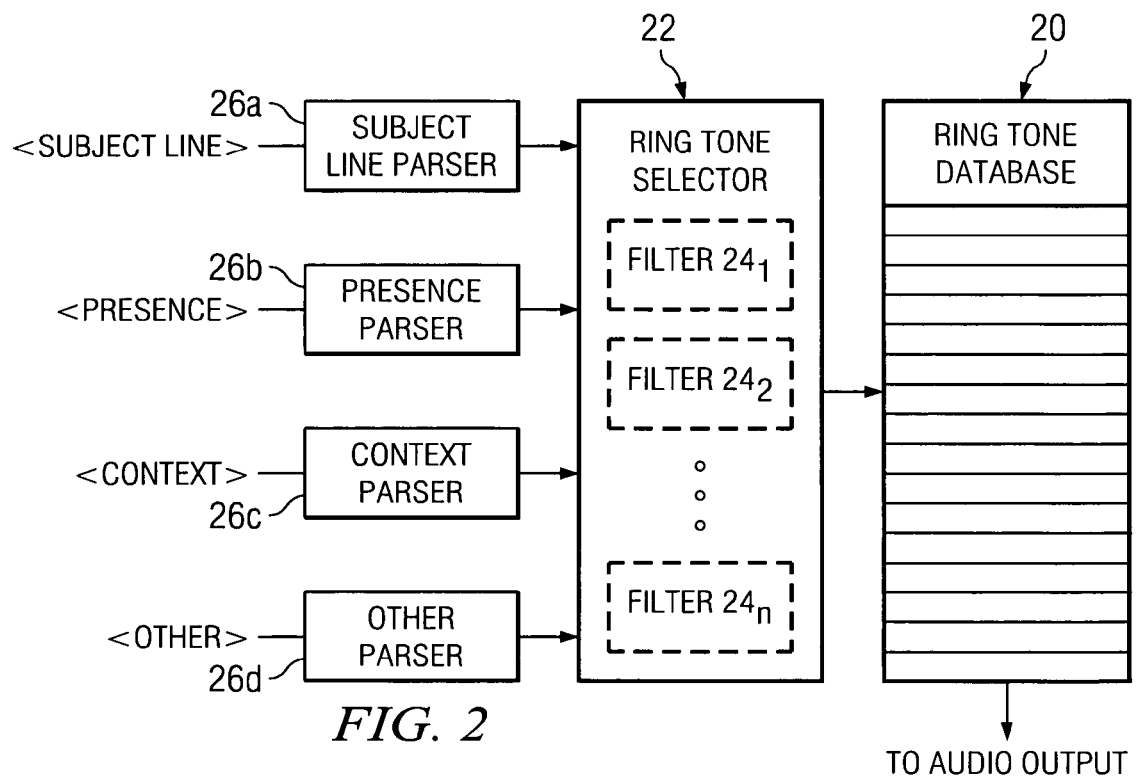
FIG. 2 illustrates a ring tone selector implemented in a phone or in an application server on a network to provide a ring tone responsive to the information regarding the nature of the call.

The present invention is best understood in relation to FIGS. 1-3 of the drawings, like numerals being used for like elements of the various drawings.

FIG. 1 illustrates a typical setup for a VOIP telephone call from a calling party phone 10 to a receiving party phone 12. The phones 10 and 12 may be any device capable of sending and receiving data over a network 14, presumed to be the Internet, although network 14 could be any public or private network. Devices that could be used as either phone 10 or 12 include, for example, a standalone VOIP phone, a desktop computer, a mobile computer (including personal digital assistants, better known as PDAs) or a mobile phone with networking capabilities. The phones 10 or 12 could be connected to the network 14 through the PSTN (public switched telephone network) using an analog modem, although typically, a broadband connection such as DSL (digital subscriber line), digital cable, or T1 connection is used to provide higher bandwidth.

There are several protocols which can be used for VOIP call setup, such as SIP (Session Initialization Protocol). A typical call setup procedure follows the following steps. First, the calling party initiates a phone call, for example, by dialing a telephone number or entering other identifying information for the receiving party. After determining the IP address of the receiving party, an "invite" message is sent to the phone 12. In the illustrated embodiment, the invite message is a request for connection that contains several categories of information that are indicative of the nature of the call, or can be used to enable the derivation of the nature of the call, as opposed to just the identity of the calling party. These categories include a Subject Line message, Presence (including Rich Presence) information, and Context Information (described below). The categories listed in FIG. 1 are for illustration of the invention; the call nature information could be provided with additional or other categories.

If the receiving party wishes to answer the phone, an "accept" message is sent to the calling party (in SIP, this message is known as a "200 OK" message). Once the accept message is received a voice connection between the phones is established for packetized voice communications.

The present invention provides the ability to generate a specific audible cue or vibration that indicates the nature of the communication request to the receiving party, without requiring the receiving party to analyze the incoming information identifying the nature of the call. In this specification, the audible cue or distinctive silent stimulation (e.g. vibration) is referred to as a ring tone. A "ring tone" is defined herein as any file that can be played by the phone 12 to provide distinctive audio or tactile stimulation. In addition to the standard ring tones that are supplied with a phone (or can be downloaded to the phone), other audio files, such as WAV, MP3, AVI, WMA, ASF, ASX, AAC, and other file formats, currently available or later developed, could be used. Further, files that create an identifiable vibration could be used to implement the ring tone. In the present invention, the ring tone files do not necessarily reside on the phone; they can be downloaded or recorded by the user on the application server, and played on the phone as a media stream from the application server during the signaling phase of the communication.

The Calling Party ID shown in FIG. 1 could contain any information that would identify the calling party, such as name and/or telephone number, or a unique identifier similar to an email address. The Subject Line is typically entered by the calling party prior to sending the Invite message and can contain any textual information. The subject line could also contain non-textual information, such as a graphical icon.

The Presence information can contain any information relevant to the current location of the calling party. Some presence information is referred to in the current literature as "rich presence", but for purposes of this specification, all such information will be referred to simply as "Presence". Presence information can include, for example, information that is provided by the calling party, derived from information sources such as calendar programs, the status of the calling device, and physical presence detectors. Some information may be gathered directly by the telephone 10, while other information can be accessed from a presence server accessible to the telephone 10. The types of information that might be included in the Presence information (and would be relevant to a decision whether to answer the phone) is shown in Table 1.

TABLE 1

Presence Information Types

| Category | Examples |
| --- | --- |
| Device Type | PC, mobile phone, wireline phone |
| Place Type | home, office, automobile, public transport, quiet public place, or general public place |
| Category Indications | Holiday, meal, meeting, travel, vacation, driving, busy |
| From | How long the current status has been valid |
| Until | How long the current status is likely to remain valid |
| Relationship | Family, associate, supervisor |

Context information includes information which may be related to the current attempt at communications between the calling party and the receiving party. This could include, for example, historical and environmental information gathered from various information repositories regarding previous communications and communication attempts. The contextual information could be derived from various database, such as call logs (including information on whether the call was answered or returned), fax logs, calendar and scheduling programs, contact databases, organizational charts, docketing programs, email, notes on calls, voice mail and so on. Additionally, in U.S. Ser. No. 11/017,434 to Suhail et al, entitled SYSTEM AND METHOD FOR PROVIDING FEATURE CUSTOMIZATION FOR A COMMUNICATIONS DEVICE BASED ON AN ACTIVE COMMUNICATIONS SESSION, filed Dec. 20, 2004, which is incorporated by reference herein, contextual information is used to fetch and display information, such as notes from previous calls, docket entries, related documents and so on.

In the preferred embodiment, each user associates a ring with one or more filters which process information which can be obtained either from the invite message or responsive to the invite message. For example, a "boss" ring could be associated with calls from any person at a higher level on the organizational chart, who (1) has at least one previous call attempt in the last 48 hours that was not returned, (2) is at a meeting, (3) is scheduled to meet with the receiving party in the next 24 hours, or (4) has urgent in the subject line.

In operation, the calling party ID would provide information indicating the identity of the calling party (if the SIP protocol is used, this information can also be obtained from the SIP URL), the subject line would provide information on what the call may be about, and the presence information in the invite message can provide information on where the calling party is currently located. Contextual information regarding previous call attempts and return calls could be derived by searching call logs using information from the Calling Party ID. Contextual information regarding upcoming meetings could be derived from a calendar program using the Calling Party ID to identify relevant appointments.

FIG. 2 illustrates a block diagram showing the basic mechanism for determining which ring tone to select. A ring tone database 20 stores a collection of ring tones (or file names that link to ring tones). A ring tone selector 22 chooses one of the ring tones from the ring tone database 20, responsive to matches between one or more filters 24 (individually labeled as filters $24_1$ through $24_n$) acting on data from parsers 26 (individually labeled as filters 26a through 26d).

In operation, the subject line parser 26a looks for any term in the subject line that is referenced in any of the filters 24 and passes those terms to the ring tone selector 22. The presence parser 24b receives presence information in the invite message and looks for any term or condition (such as <placetype>=automobile) in the presence information. The context parser 24c receives context information from a number of sources responsive to queries based on information from the Calling Party. ID and subject matter fields. The context information may come from a separate context server, or the queries may be initiated by the context parser 24c. An "other" parser 24d is used to illustrate that other information can be used in the decision making process as well.

The ring tone selector 22 determines whether there are any filter matches. If there are, the ring tone specified in the matching filter is used to indicate an incoming call. If not, a default ring tone is used.

Possibly, more than one filter can provide a match on a single invite message. For example, a receiving party could have one filter provide a first ring tone for any call that has "urgent" in the subject line and a second filter provide a second ring tone for a call from his or her spouse. If the spouse were to call with a subject line including the word "urgent", both filters could match, with conflicting ring tones. Many possible solutions to a conflict could be implemented. One solution would be to have a priority value associated with each filter. A second solution would be to alternate rings when there was more than one match. A third solution would be to default to a specific ring tone whenever there is a conflict. In the preferred embodiment, the options would be configurable by the user.

All VOIP phone designs employ one or more processors to execute one or more tasks to perform communications. The ring tone selector 22 and parsers 24 can be implemented as additional programs in a phone 12, which is executed by the phone's processor. No additional hardware should be needed outside of that normally available on a phone capable of handling VOIP calls. Alternatively, all or part of the function shown in FIG. 2 could be implemented in the network server as follows. In one embodiment, the ring tone selector can reside in an application server with the presence, context and subject parsers residing on the same server or in one or more servers distributed within the network. The application server could then process all the necessary information in order to select the desired ring tone and send the selected ring tone file as a media stream to the user's device during the signaling phase of the communication. In this manner, the user's communications device is freed from using precious resources for ring tone processing. Further, less capable and less powerful communication devices can also benefit from the present invention.

FIG. 3 illustrates a simplified setup screen for designing a filter to associate a ring tone with a set of criteria indicative of the nature of the call. This filter, "boss_and_urgent" plays the ring tone "Beethoven's Fifth" if either of two conditions are met: (1) the calling party is on a higher level than the receiving party on the company's organization chart and an unanswered call is pending or (2) the word "urgent" is in the subject line. A silent ring tone field selects a tactile ring tone to be used if the phone is in silent mode. The filter is assigned a priority value of "2", meaning that this ring tone will be used if a concurrent filter match has a priority of 3 or higher (priority value could be either ascending or descending with high priority, as would be known to one skilled in the art). In the illustrated embodiment, drop-down boxes are used to aid in choosing fields (such as calling party, location, meeting scheduled, and so on), conditional operators (<, >, =, is, is not, contains . . . ) and values (where pre-set values are associated with a field).

In addition to filters generated by a user, the communication application on the user's device or on the application server can also contain predetermined filters for common situations and a set of filters that are standard to a company (if phone 12 is being used in a work environment).

As stated above, in addition to musical ring tones, it may be desirable to use verbal ring tones, such as a speech file "the boss is making an urgent call". Further, a graphic design or a video file or animation could be used in conjunction with or in place of a ring tone.

Many methods of implementing the silent ring tone are available. One way is to literally spell out phrases using some predetermined standard code. For instance, the Morse Code can be implemented by using "dots" (short vibrations) and "dashes" (long vibrations) to produce identifiable patterns. A DotDotDotDashDashDashDotDotDot (Morse code for "SOS") could be used for emergency calls. Similarly, a pad coupled to the communication device could output Braille or similar characters. Another way would be to implicitly communicate the information about the nature of the call. For instance, the user can configure different vibration patterns for different filters. For example, a short vibration followed by two long vibrations can mean that the call subject has the keyword "report" in it. Another example is shown in FIG. 3, where the "DotDotDotDash" file would provide a tactile stimulation similar to the beginning of Beethoven's Fifth, so the audio ring tone and silent ring tone would be related. The use of tactile stimulation can be of benefit not only in situations where silence is required, such as in a theater or meeting, but also for the vision and/or hearing impaired.

The present invention improves upon the efficiency of communications. Without looking at any information associated with the attempted connection, the receiving party can quickly determine whether the communication takes precedent over other matters at hand. This is particularly useful with certain device types, such as a mobile wireless communication device, where answering a communication request may require closing another program. Additionally, the user may have power to route a communication request (for example, to voice mail or to another party) without answering the call, based on the ring tone.

While the ability to judge whether to accept the call without looking at the phone is important, the ability to process information about the nature of the call to make an informed decision on answering the call or whether certain preparatory steps should be taken before answering the call is perhaps even more powerful. For example, even though the information may be available, it is not feasible for a user to receive the identity of a caller and look up the number of times the caller has called before, or look up associated docket entries for the calling party. In another example the user can open a given file or look up an important contact before answering the call. The invention allows the receiving party to make informed decisions on whether to answer a call based on predetermined filters specifying multiple criteria from different information sources.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

The invention claimed is:

1. A method of identifying the nature of a desired communication, comprising the steps of:
    sending an invite message to a receiving party regarding a request for communication that contains several categories of data related to a plurality of purposes of communication, wherein the data related to the plurality of purposes of communication includes at least two of: presence information, presence rich information, calling party identification, subject matter information, and context information;
    receiving the data related to a the plurality of purposes of the communication, wherein the data is received, processed and stored in a database located in a receiving party's communication device;
    comparing the data to predetermined criteria by searching for at least two of a plurality of terms related to the plurality of purposes that are referenced in at least a first filter of a plurality of filters, the plurality of purposes that are referenced in at least a second filter of a plurality of filters, the plurality of terms related to the plurality of purposes that are referenced in at least a third filter of a plurality of filters receiving the data; and
    circuitry for selecting, when the at least two of the terms match, wherein more than the at least two of the terms can match more than one of the at least one first filter and at least one second filter and at least one third filter, at least a first identifying file by at least one of the filters and at least a second identifying file by the at least second one of the filters and at least a third identifying file by the at least third one of the filters from a set of identifying files responsive to the comparing step for presentation to a receiving party information.

2. The method of claim 1 wherein the comparing step comprises the step of comparing the data to predetermined criteria specified in a plurality of filters.

3. The method of claim 1 wherein the selecting step comprises the step of selecting an identifying file associated with a matching filter.

4. The method of claim 3 wherein the selecting step comprises the step of selecting a ring tone file associated with the matching filter.

5. The method of claim 4 wherein the ring tone file comprises a file for generating spoken words.

6. The method of claim 4 wherein the ring tone file comprises a file for identifiable tactile stimulation.

7. The method of claim 6 wherein the ring tone file uses tactile stimulation to represent characters.

8. The method of claim 3 wherein the selecting step comprises the step of selecting a graphic file associated with a matching filter.

9. The method of claim 1 wherein the receiving step comprises the step of receiving presence information.

10. The method of claim 1 wherein the receiving step comprises the step of receiving context information derived responsive to information in a connection request message.

11. The method of claim 1 wherein the receiving step comprises the step of receiving a subject line associated with the communication.

12. A phone system for providing communication over a data network comprising:
   circuitry for sending an invite message, once an internet protocol address is received, to a receiving party regarding a request for communication that contains several categories of data related to a plurality of purposes of communication, wherein the data related to the plurality of purposes includes at least two of: presence information, presence rich information, calling party identification, subject matter information, and context information;
   receiving the data related to the plurality of purposes of the communication, wherein the data is received, processed and stored in a database located in a receiving party's communication device;
   circuitry for comparing the data to predetermined criteria by searching for at least two of a plurality of terms related to the plurality of purposes that are referenced in at least a first filter of a plurality of filters, the plurality of purposes that are referenced in at least a second filter of a plurality of filters, the plurality of terms related to the plurality of purposes that are referenced in at least a third filter of a plurality of filters receiving the data; and
   circuitry for selecting, when the at least two of the terms match, wherein more than the at least two of the terms can match more than one of the at least one first filter and at least one second filter and at least one third filter, at least a first identifying file by at least one of the filters and at least a second identifying file by the at least second one of the filters and at least a third identifying file by the at least third one of the filters from a set of identifying files responsive to the comparing step for presentation to a receiving party information.

13. The phone system of claim 12 wherein the comparing circuitry comprises circuitry for comparing the data to predetermined criteria specified in a plurality of filters.

14. The phone system of claim 12 wherein the selecting circuitry comprises circuitry for selecting an identifying file associated with a matching filter.

15. The phone system of claim 14 wherein the selecting circuitry comprises circuitry for selecting a ring tone file associated with the matching filter to provide an audible output.

16. The phone system of claim 15 wherein the ring tone comprises spoken words.

17. The phone system of claim 15 wherein the selecting circuitry comprises circuitry for selecting a file for producing an identifiable tactile stimulation.

18. The phone system of claim 17 wherein the identifiable tactile stimulation represents characters.

19. The phone system of claim 14 wherein the selecting circuitry comprises circuitry for selecting a graphic file associated with a matching filter to provide a visual output.

20. The phone system of claim 12 wherein the data includes presence information.

21. The phone system of claim 12 wherein the data includes context information derived responsive to information in a connection request message.

22. The phone system of claim 12 wherein the data is provided by a subject line associated with the communication.

* * * * *